United States Patent
Scharkowski (10) Patent No.: US 11,205,860 B2
(45) Date of Patent: Dec. 21, 2021

(54) ELECTRICAL CONNECTION AND METHOD OF ESTABLISHING AN ELECTRICAL CONNECTION

(71) Applicant: Auto-Kabel Management GmbH, Hausen i.W. (DE)

(72) Inventor: Oliver Scharkowski, Cottbus (DE)

(73) Assignee: Auto-Kabel Management GmbH, Hausen i.W. (DE)

( * ) Notice: Subject to any disclaimer, the term of this patent is extended or adjusted under 35 U.S.C. 154(b) by 0 days.

(21) Appl. No.: 17/261,674

(22) PCT Filed: Jul. 9, 2019

(86) PCT No.: PCT/EP2019/068355
§ 371 (c)(1),
(2) Date: Jan. 20, 2021

(87) PCT Pub. No.: WO2020/020628
PCT Pub. Date: Jan. 30, 2020

(65) Prior Publication Data
US 2021/0265748 A1  Aug. 26, 2021

(30) Foreign Application Priority Data

Jul. 26, 2018 (DE) ................ DE10 2018 118 124.8
Aug. 15, 2018 (DE) ................ DE10 2018 119 844.2

(51) Int. Cl.
*H01R 4/02* (2006.01)
*H01R 4/62* (2006.01)
*H01R 43/02* (2006.01)

(52) U.S. Cl.
CPC ............. *H01R 4/029* (2013.01); *H01R 4/625* (2013.01); *H01R 43/0207* (2013.01)

(58) Field of Classification Search
CPC ........ H01R 4/029; H01R 4/625; H01R 4/023; H01R 4/187; H01R 43/0207
(Continued)

(56) References Cited

U.S. PATENT DOCUMENTS 5,147,082 A * 9/1992 Krause ................. B23K 20/106
228/1.1
5,642,852 A * 7/1997 Suzuki ................... B23K 20/10
228/110.1
(Continued)

FOREIGN PATENT DOCUMENTS

DE   102015106265 A1   8/2016
DE   112015000538 T5   10/2016
(Continued)

OTHER PUBLICATIONS

International Searching Authority/European Patent Office, Internatonal Search Report and the Written Opinion of the International Searching Authority, Application No. PCT/EP2018/068355, dated Oct. 7, 2019, (with English translation of the search report), 21 pages.
(Continued)

*Primary Examiner* — Peter G Leigh
(74) *Attorney, Agent, or Firm* — Sunstein LLP (57) ABSTRACT

The present invention relates to an electrical connection between a flat part and a connecting part, in which the flat part and the connecting part are arranged one above the other in an overlap region, in which the contact surface of the flat part facing the connecting part in the overlap region is structured in relief-like fashion and that the flat part is friction-welded, in particular ultrasonically welded, to the connecting part via the structured contact surface.

28 Claims, 10 Drawing Sheets

(58) Field of Classification Search
USPC .......................................................... 439/874
See application file for complete search history.

(56) References Cited

U.S. PATENT DOCUMENTS

| | | | | | |
|---|---|---|---|---|---|
| 6,184,471 | B1* | 2/2001 | Asakura | ........... | H01R 13/65914 |
| | | | | | 174/78 |
| 6,644,534 | B2* | 11/2003 | Hanazaki | ............... | B23K 20/10 |
| | | | | | 228/110.1 |
| 8,047,420 | B2* | 11/2011 | Stroh | ................. | H01R 43/0207 |
| | | | | | 228/110.1 |
| 8,118,209 | B2* | 2/2012 | Ohnuma | ........... | H01R 43/0207 |
| | | | | | 228/110.1 |
| 8,137,125 | B2* | 3/2012 | Takehara | ............... | H01R 43/28 |
| | | | | | 439/427 |
| 8,851,935 | B2* | 10/2014 | Yoshioka | ............... | H01R 4/023 |
| | | | | | 439/694 |
| 8,931,685 | B2* | 1/2015 | Kataoka | ................. | H01R 4/021 |
| | | | | | 228/110.1 |
| 9,379,506 | B2* | 6/2016 | Lehmann | ........... | H01R 43/0207 |
| 9,419,490 | B2* | 8/2016 | Kajita | ...................... | H02K 3/50 |
| 9,711,875 | B2* | 7/2017 | Ooba | ................. | H01R 43/0207 |
| 9,859,624 | B2* | 1/2018 | Roan | ........................ | H01R 4/04 |
| 2004/0088857 | A1* | 5/2004 | Fujimoto | ............... | H01R 11/12 |
| | | | | | 29/871 |
| 2006/0121773 | A1* | 6/2006 | Ichikawa | ........... | H01R 13/5216 |
| | | | | | 439/408 |
| 2011/0198122 | A1* | 8/2011 | Sagawa | .................. | H01R 4/029 |
| | | | | | 174/84 R |
| 2015/0099406 | A1* | 4/2015 | Tsuge | ..................... | H01R 4/023 |
| | | | | | 439/874 |
| 2016/0336662 | A1 | 11/2016 | Ooba | | |
| 2017/0317429 | A1* | 11/2017 | Roan | ...................... | H01R 4/304 |
| 2017/0318660 | A1* | 11/2017 | Roan | .................. | G01R 19/0092 |
| 2018/0021884 | A1 | 1/2018 | Brunner et al. | | |
| 2018/0123275 | A1* | 5/2018 | Meier | .................... | H01R 13/35 |
| 2019/0217428 | A1* | 7/2019 | Packebusch | ........... | B23K 20/10 |

FOREIGN PATENT DOCUMENTS

| | | |
|---|---|---|
| DE | 102016110628 A1 | 12/2017 |
| DE | 102016125748 B3 | 3/2018 |
| JP | 2002025740 A | 1/2002 |
| JP | 2016225193 A | 12/2016 |
| WO | WO 2019/149396 A1 | 8/2019 |

OTHER PUBLICATIONS

German Patent Office, Office Action, Application No. 10 2018 119 844.2, dated Mar. 14, 2019, 6 pages (in German).

* cited by examiner

ELECTRICAL CONNECTION AND METHOD OF ESTABLISHING AN ELECTRICAL CONNECTION

CROSS-REFERENCE TO RELATED APPLICATIONS

This application is the national phase entry of international patent application no. PCT/EP2019/068355 filed Jul. 9, 2019 and claims the benefit of German patent application No. 10 2018 118 124.8, filed Jul. 26, 2018, and German patent application 10 2018 119 844.2, filed Aug. 15, 2018, the disclosures of which are incorporated herein by reference in their entirety.

TECHNICAL FIELD

The subject-matter relates to an electrical connection between a flat part and a connecting part and a method of establishing such an electrical connection. The electrical connection will be used in particular in automotive applications, in particular for the connection of flat conductors with connecting parts, such as areas of battery lines which are designed as flat cables, battery cell connectors or busbars which are designed as flat conductors among other things.

BACKGROUND ART

The electrical connection of flat conductors with connecting parts must be permanently stable, especially in automotive applications. In addition, a low contact resistance is required, especially in the area of the energy conductors of motor vehicles, in order to keep the electrical losses across the transition as low as possible. This is particularly important in the area of battery cables and battery cell connectors.

In addition, the use of aluminium for electrical conductors in motor vehicles has become established. However, the material aluminum poses new challenges for the joining technology, both in terms of contact resistance and in terms of joining with other metal materials. In view of the high demands on current-carrying capacity, high conductor cross-sections are usually used, which means that other base materials are also challenging for the mostly material-bond connection technology.

Against this background, the subject-matter was based on the object of providing a long-term stable electrical connection between a flat part and a connecting part, which is able to establish the required long-term stable electrical connection not only by means of a material bond, but also additionally by means of a positive form locking and, in particular, also allows for a particularly process-safe and/or economical manufacturing.

SUMMARY OF THE INVENTION

The flat part can be formed as a solid material part, for example with a square or rectangular cross-section. The connecting part can also be made of solid material, for example with a square or rectangular cross-section, and can for example also be a flat part or a connecting lug, a crimp connection, a clamping connection, a connection for a bolt or the like. The connecting part can be a stranded conductor made of a metal material, in particular aluminium material or copper material. Both the flat part and the connecting part can be formed as a conductor of a cable. The cable may be stripped in the overlap area between the connecting part and the flat part, so that the bare metal of the flat part and the connecting part can be arranged one above the other in the overlap area.

The connecting part can be made of a solid conductor or a flexible conductor. The base material of the connecting part and the flat part can be the same or different. Connecting part and flat part can be coated. Especially the flat part can be nickel-plated. The coating can be applied especially in the contact area. The base material and coating materials can be different from each other.

The flat part has four surfaces on the circumference, whereby a rectangular cross-section has two wide surfaces, preferably parallel to each other, and two narrow surfaces, preferably parallel to each other. The flat part has a longitudinal extent. Side edges of the wide surfaces and side edges of the narrow surfaces run along the longitudinal extent. The flat part has front edges on the front side, which run in transverse extent. The narrow surfaces extend along a height extent of the flat part.

Especially the wide surface of the flat part can be formed as contact surface in one area. For this purpose, the surface of the flat part is structured in relief in the contact surface, i.e. in particular in the area of overlap between the connecting part and the flat part. The connecting part is placed on this relief-like structure and friction-welded, especially by means of ultrasonic welding.

Due to the relief-like structure of the contact surface, the connecting part only rests on a small total area of the flat part at the beginning of the welding process. The contact surface has a total area, but due to the relief-like structure only a fraction of this total area is in contact with the connecting part at the beginning of the welding process.

This means that at the beginning of the welding process the applied welding energy, in particular the vibration energy, only acts on the small touching surface and therefore the contact pressure in the area of the touching surface is particularly high. Due to the reduction of the contact surface as a result of the relief structure, the frictional force at a given friction coefficient of the joining partners to each other in the solid state of aggregation is sufficiently small at the beginning of the welding process so that the welding tool can introduce sufficient kinetic energy selectively into the joining zone to partially melt the joining partners.

With increasing welding time, more energy is introduced into the joining zone. The edge layers of the joining partners plasticize starting from the initial joining area. The joining area increases due to the type of structure and plasticizing of the joining partners in the joining zone. Plasticising reduces the friction coefficient, so that despite the increasing contact area, the kinetic energy of the welding tool is sufficient to complete the welding process.

The relief structure leads to a very quick plasticizing of the materials of flat part and/or connecting part in the area of the touching surface between flat part and connecting part, at the beginning of the welding process. Gradually, the connecting part penetrates deeper into the relief structure due to the plasticizing that occurs.

Firstly, the welding creates a material bond across the contact surface. Due to the relief-like structure, however, there is an additional form locking between the flat part and the connecting part in the area of the contact surface even in the welded state. The welding energy that is introduced into the contact surface is sufficient to superficially melt and/or plasticize the two joining partners, the flat part and the connecting part. Here, the relief shape of the contact surface is preferably sufficiently coarse, so that it is preserved even after the welding process and thus not only a material bond but also a form locking between the connecting part and the flat part is achieved.

The structure of the contact surface extends along the longitudinal section of the flat part as a height profile with valleys (grooves) and hills (groove webs). This height profile is preferably undulated along the longitudinal section of the flat part. The fact that the structure is only slightly changed by the welding process and that the structure of the contact surface is still present after the welding process not only results in a material bond between the flat part and the connecting part in the area of the contact surface, but the flat part and the connecting part are also connected in a positive locking. During welding, on the one hand, material of the flat part is plasticized in the area of the hills of the structure, which means that after welding an amplitude of the structure is smaller than before welding, but at the same time the structure penetrates into the material of the connecting part during welding, so that a surface that is essentially straight in longitudinal section of the flat part in the overlap area after welding is also structured and adapted to the structure of the flat part. The connecting part and flat part thus interlock with each other, which increases the mechanical strength of the welded joint.

According to an embodiment, it is proposed that the structure is regularly periodic. Thus, hills follow valleys in a regularity with a certain periodicity. A period can be understood as a distance between two adjacent hills and/or a distance between two adjacent valleys.

It has been found that both the amplitude and the period of the structure influence the quality of the welded joint. In particular, the amplitude and/or period of the structure must be selected depending on a material parameter of the contact surface. The contact surface can be formed of the material of the flat part or a metallic coating. Depending on the material, a different amplitude and/or a different period must be selected. A material parameter that can be used to determine amplitude and period is the density of the material of the contact surface.

According to an embodiment it is proposed that the amplitude is antiproportional to the density of the material of the contact surface. The denser the material of the contact surface is, the smaller the amplitude of the structure, especially half the distance between a hill (local maximum) and a valley (local minimum), should be. In the case of a dense material, the lower amplitude results in a still sufficient form locking and, in particular, the joining partners lie completely against each other in the area of the contact surface after the welding process.

According to an embodiment, it is proposed that the period is proportional to the density of the material of the contact surface.

According to an embodiment, it is proposed that the material of the flat part has a density>8.2 g/cm³. For such a density, for example, an amplitude of 0.2 cm has proven to be sensible.

It is also proposed that the material of the flat part has a conductance of >50 MS/m. It is proposed that the density and/or the conductance of the material of the connecting part is equal to that of the flat part.

It is also proposed that the material of the connecting part is formed from an aluminium alloy according to EN AW 2017A, EN AW 6082 or EN AW 7075.

According to an embodiment, it is proposed that the density and/or conductance of the flat part material is lower than the density and/or conductance of the connecting part material. In particular, it is proposed that the material of the flat part has a density between 2.5 g/cm³ and 5 g/cm³ and a conductance between 30 MS/m and 40 MS/m. It is also proposed that the material of the connecting part has a density between 8 g/cm³ and 9 g/cm³ and an electrical conductance between 40 MS/m-50 MS/m.

According to an embodiment, it is proposed that the structure is formed in the direction x of a longitudinal axis of the contact surface according to a function $h(x)=h_0 f(x)$. Where $h_0$ is the amplitude and $f(x)$ is a trigonometric function. In particular $f(x)=\sin(2\pi x)$ or $\cos(2\pi x)$.

In such a case, the amplitude $h_0$ can be chosen for example as follows, depending on the density.

| Density in g/cm³ | $h_0$ in cm |
|---|---|
| 2.0 - 2.5 | 1.3 |
| 2.5 - 3.0 | 1.4 |
| 3.0 - 3.5 | 1.3 |
| 3.5 - 4.0 | 1.2 |
| 4.0 - 4.5 | 1.1 |
| 4.5 - 5.0 | 1.0 |
| 5.0 - 5.5 | 0.9 |
| 5.5 - 6.0 | 0.8 |
| 6.0 - 6.5 | 0.7 |
| 6.5 - 7.0 | 0.6 |
| 7.0 - 7.5 | 0.5 |
| 7.5 - 8.0 | 0.4 |
| 8.0 - 8.5 | 0.3 |
| 8.5 - 9.0 | 0.2 |

According to an embodiment, it is proposed that the structure is formed by hills (groove webs) and valleys (grooves). The hills preferably lie in a plane below a level of the wide surface and the valleys in a plane below the level of the hills.

The flat part extends on a wide surface in the direction of the contact surface. In the area of the contact surface the structure is then introduced. The structure is introduced in such a way that the plane of the hills of the structure is below the wide surface of the flat part. The height extent of the flat part in the area of the contact surface is smaller than the height extent of the flat part in front of the contact surface. Due to the lower structural height of the flat part in the area of the contact surface, the structural height of the electrical connection is also reduced. If the connecting part is placed on the hills, the structural height is less or equal to that of the connecting part placed on the wide surface of the flat part. After welding, the connecting part has penetrated into the structure, so that a connection is preferably produced in which the wide surface of the flat part at the transition to the connecting part has only a small, preferably no height offset. This results in a reduced height offset compared to a connection where the connecting part is placed directly on the wide surface of the flat part.

According to an embodiment, it is proposed that the contact surface is free of the structure in a frontal end area. The structure continues from the center of the flat part to a frontal end area. However, the structure is terminated before the front end area so that the flat part ends evenly in the front end. This prevents notching strain of the electrical connection in the end area of the contact surface. In particular, the structure runs out into the flat end area starting from a zero passage of the wave-shaped structure.

According to an embodiment, it is proposed that in a frontal end area the contact surface runs parallel to a wide surface of the flat conductor in front of the contact surface. The longitudinal extent of the end area is in particular at least a half, preferably a whole period.

According to an embodiment it is proposed that the flat part has a smaller height extent in the area of the contact surface than in an area in front of the contact surface. As explained before, the hills can be located in a plane below the plane of the flat part in front of the contact surface. This reduces the structure or the structural height of the connection between flat part and terminal part, which is advantageous in terms of space optimization.

It is also proposed that the flat part has a smaller width extent in the area of the contact surface than in an area in front of the contact surface. The flat part can be narrower in the area of the contact surface than in an area in front of the contact surface. This has the advantage that the connecting part protrudes over the contact surface at the side edges.

Thus it is also proposed that the flat part is a flat conductor, that the connecting part in the overlap area projects beyond the flat part in the width extent and that the connecting part is formed around at least one longitudinal edge in the overlap area. The connecting part is pressed against the flat part by means of a sonotrode. By applying the welding energy, the connecting part flows around the flat part in the area protruding over the overlapping area. This protects the joining zone from environmental influences.

In the joint state, the connecting part lies on the contact surface in such a way that it preferably protrudes over the longitudinal edge of the flat part on both sides. These areas protruding over the flat part can be bent over in the direction of the narrow surface of the flat part, preferably flowed around. Since the width of the flat part is smaller in the area of the contact surface than in front of the contact surface, the total width of the flat part is preferably not increased by flowing around the connecting part around the longitudinal edges.

According to an embodiment, it is proposed that the connecting part encloses the flat part in a U-shape in the overlap area. By enclosing the flat part in a U-shape or even only on one side, the connection is stabilized against a force in the transverse direction of the flat part and is therefore more stable. Torsions around a surface normal of the wide surface are also better compensated by the enclosing and do not directly affect the weld. A further advantage is that the U-shaped enclosing prevents gases or fluids from entering into the joining zone.

According to an embodiment, it is proposed that the flat part is metallically coated at least in the area of the contact surface. Such a coating can be roll cladded, for example. For example, it is possible to apply an aluminium strip to the flat part, especially by roll cladding.

According to an embodiment, it is proposed that the flat part has a terminal console on its side opposite the contact surface in the longitudinal direction. This terminal console can be used to contact an electrical conductor, for example.

The terminal console can be formed as a terminal bolt, terminal lug, crimp contact, terminal opening, cable lug or similar. In particular, the connection console can be formed as a connection hole.

For contacting with a conductor made of a material different from the material of the flat part, it is proposed that the terminal bracket is metallically coated. In particular, the flat part is metallically coated around the connection opening. Thus, a good contact surface can be ensured in case of screwing.

To absorb compression forces acting on the welded joint in the longitudinal direction, it is proposed that the flat part has an S-shaped longitudinal profile. This makes it possible to absorb compressing forces elastically resiliently through the flat part. The mechanical load on the welded joint is thus reduced.

According to an embodiment, the flat part is made of aluminium material and the connecting part of copper material. An aluminium material is especially E-aluminium, for example Al 99.5 or another aluminium alloy. A copper material is in particular a copper alloy. A further copper cable, for example a flexible stranded copper cable, can be attached to the connecting part, which is made of copper material, for example by crimping, soldering, riveting, screwing, welding or the like. The flat part is made of the aluminium material and can be formed as the core of a flat cable, for example, and insulated outside the connection with the connecting part.

According to an embodiment, the connection part is made of aluminium material and the flat part of copper material. In this case, the flat part can be used for a connection, in particular for a single grade connection with a copper cable. A copper material is in particular a copper alloy. A further copper cable, for example a flexible stranded copper cable, can be attached to the flat part, which is made of copper material, by crimping, soldering, riveting, screwing, welding or the like. The connecting part is made of the aluminium material and can be formed as the core of a flat cable, for example, and insulated outside the connection with the connecting part.

It is also proposed that the flat part and the connecting part are made of the same metallic material, e.g. an aluminium material or a copper material.

In particular, the relief-shaped contact surface is inserted into the flat part by cutting or non-cutting means. It is possible, for example, that the flat part is milled over in the area of the contact surface before the connection in order to form the relief-like contact surface. Non-cutting forming can be done by bending, punching, pressing, drawing, compressing, forging or similar methods.

According to one design example, it is proposed that the relief-like contact surface is brought into the flat part by bending, punching, pressing, drawing, compressing, forging. By means of a tool, for example a suitable punch, the relief-like contact surface can be brought into the flat part.

The relief-like contact surface is preferably a closed surface and does not have any openings through the flat part. This ensures that in the welded state the connecting part is completely taken up by the flat part and a full-surface connection between connecting part and flat part is formed. This results in a good, low contact resistance.

Friction welding removes any contamination on the surface of the parts to be joined. This is particularly the case with ultrasonic welding, which breaks up an aluminium oxide layer, for example. Due to the relief-like structure, the total surface area of the contact surface is increased compared to a smooth structure, which means that the contact area between the connecting part and the flat part is increased compared to a connection of two smooth surfaces. This larger touching area results in lower contact resistance, which is particularly advantageous in automotive applications.

For example, the relief-like structure can be such that in a longitudinal section parallel to the longitudinal axis of the flat part, the structure is undulated or stepped. It is also possible that in a cross section, especially in a plane perpendicular to the longitudinal axis of the flat part, the surface structure is undulated or stepped. An undulating shape does not necessarily have to be strict and monotonous, but can also be sawtooth, V-shaped, U-shaped or similar. Also, the sequence of trough and crest does not necessarily have to be regular.

According to an embodiment, it is proposed that the structured surface in a plan view is undulated or stepped. Not only in the depth, but also in the longitudinal direction of the relief-like structure can it be undulated or stepped. This also leads to an increase in the contact surface between the connecting part and the flat part.

According to an embodiment, it is proposed that in the welded state the connecting part penetrates completely into the recess of the relief-shaped contact surface and/or that in the welded state protrusions of the relief-shaped contact surface penetrate at least partially into the connecting part. In a relief-like structure there are valleys and hills, whereby the valley can be understood as a recess and a hill can be understood as a protrusion. It is understood that starting from the surface of the flat part on which the contact surface is formed, recesses can be made in the material of the flat part and/or protrusions can be formed from the surface. The fact that the connector penetrates completely into the recess and/or the protrusion penetrates completely into the connector results in a full-surface contact between connector and flat part via the contact surface. As already explained, the protrusion and/or recess increases the contact surface compared to a smooth surface. In the welded state, the protrusion and/or recess are still formed by the material of the flat part. Only in a transition area an intermetallic joining zone is formed, whose extent perpendicular to the contact surface is however smaller than the extent of the recess and/or protrusion perpendicular to the contact surface.

Due to the fact that the material of the flat part still has protrusions and/or recesses after welding in a section through the connection in the welded state, which runs transverse to the longitudinal direction of the recesses and/or protrusions of the relief-like contact surface, zones are formed in which the connecting part is completely located in the recesses.

As already explained, the flat part can be structured in relief in the area of the contact surface. This is caused by recesses and/or protrusions in the surface of the flat part.

It is also conceivable that both joining partners in the contact area have a relief-like surface that geometrically interlock to form properties fulfilling constructional or other conceivable functions. In particular, it is proposed that in a joining zone the surfaces of the flat part and the contact part facing each other are structured in relief. In particular, these surfaces are structured in the same way. The surface of the contact part facing the flat part can be structured exactly as described for the flat part.

According to an embodiment, it is proposed that the recesses are formed by grooves in the contact surface. According to another design example it is proposed that the protrusions are formed by webs protruding from the contact surface.

As already explained, the protrusions do not have to protrude from the flat surface of the flat part in which the contact surface is formed. Therefore the protrusions can also be formed by groove webs between grooves in the contact surface. The protrusions can therefore in particular be located below the contact surface or the other surface of the flat part in which the contact surface is formed.

As already explained, the recesses do not have to penetrate the flat surface of the flat part in which the contact surface is formed. Therefore, the recesses can also be formed between two webs that are formed as protrusions. The bottom of the recesses can therefore be plane-parallel to the contact surface or the other surface of the flat part in which the contact surface is formed.

A further aspect is a process for producing an electrical connection.

Here, for example, a flat part is first provided. The flat part can be formed as the core of a flat cable, for example. The flat cable can be stripped in the area of the connection, for example. The insulation can be stripped using a laser, for example. However, the flat part can also be part of a contact part, for example a crimp connection, a terminal lug, a terminal clamp, a connecting bolt or similar.

A structured, relief-like surface is formed into the provided flat part. The surface can be formed either by cutting or non-cutting methods. For example, it is possible to structure the surface by milling. It is also possible, for example, to profile the surface by means of non-cutting forming, as explained above, so that it is structured in relief. The structure is then strip-shaped.

In addition to the forming of the structured relief-like surface, a connecting part is provided. The connecting part can be formed like the flat part. It is possible that the connecting part is formed in the same way or that the connecting part is a contact part to be attached to the flat part.

The two parts, flat part and connecting part, are then placed on top of each other. This is done in the area of an overlap between connecting part and flat part, whereby this overlap is in the area of the relief-shaped surface. This relief-like surface is also called contact surface.

The relief-like surface is formed on the flat part, especially on the area of the wide surface. The relief-like surface is in particular formed on one end of a flat part, but can also be located in the middle between two ends and, for example, be framed on both sides by insulation. Then the welding between the connecting part and the flat part in the area of the contact surface is done by friction welding, especially ultrasonic friction welding. For this purpose, a welding tool, in particular an ultrasonic tool, e.g. a sonotrode, is applied to the connecting part and/or flat part and the two parts are pressed together. On the side opposite the ultrasonic tool, an anvil can serve as a counter bearing, for example.

The pressed parts are friction-welded, in particular ultrasonically welded, by means of the welding tool.

Since the surface to be welded is the contact surface and this is structured in relief, only a fraction of the total surface of the connecting part lies on the contact surface at the beginning of the welding process. The contact pressure is thus distributed over a very small area, so that the contact pressure in the area of the initial touching surface becomes very high. As a result, the contact pressure can be reduced compared to conventional welding processes.

In addition, this high contact pressure very quickly leads to a plasticizing of the joining partners, i.e. the connecting part and the flat part. Due to this plasticizing, the connecting part gradually penetrates the relief-like structure of the contact surface during the welding process.

As explained above, the height profile extends in relief in the direction of the longitudinal axis. The height profile is linear in the direction of the transverse axis. The hills and valleys run parallel to the transverse axis. To achieve the above mentioned advantages, it is proposed that during welding, the welding tool oscillates in parallel to the relief-shaped structure. This means that one oscillation direction of the welding tool is parallel to a direction of at least one hill of the structure. The welding tool performs an oscillation parallel to the structure. This oscillation is transmitted via a force transmission to the connecting part resting on the flat part. During welding, the connecting part is first guided over the plane of the structure formed by the hills. The contact surface is relatively small, so that even at low contact pressure, sufficient kinetic energy can be introduced into the joint to plasticize it.

At the end of the welding process, the connecting part may have completely penetrated the relief-like surface of the flat part and a full-surface connection is formed between the connecting part and the contact surface.

It is also proposed that before welding, the connecting part is pressed onto the relief-like structure, and that thereby a relative position of the longitudinal axes of the connector and the flat part are fixed with relation to each other, and then the flat part and the connector are welded together. By pressing the connecting part against the structure, the connecting part deforms in the area of its surface corresponding to the structure.

The contact pressure is sufficient to cause a plastic deformation of the surface of the connecting part according to the structure. There is already a positive locking between the connecting part and the flat part through the structure. This positive locking prevents the relative position of the connecting part and the flat part from being displaced along their longitudinal axes. If oscillation energy is now introduced, the parts no longer shift against each other but are pre-positioned in relation to each other by means of the structure. This makes the positioning of the parts in relation to each other process-safe.

BRIEF DESCRIPTION OF THE DRAWINGS

In the following, the subject-matter will be explained in more detail by means of a drawing showing examples. In the drawing show.

DETAILED DESCRIPTION OF SPECIFIC EMBODIMENTS

Figure 1A:
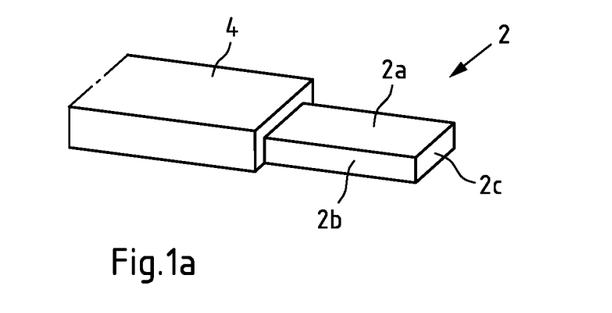
FIG. 1a-c parts that can be flat parts and/or connecting parts.

FIG. 1 shows a flat part 2 of a flat cable 4. The flat part 2 has a rectangular cross-section with two opposite wide surfaces 2a and two opposite narrow surfaces 2b as well as an end surface 2c.

The flat part 2 is freed from an insulation of the cable 4 at the end and can be used for the connection according to the subject-matter.

Figure 1B:
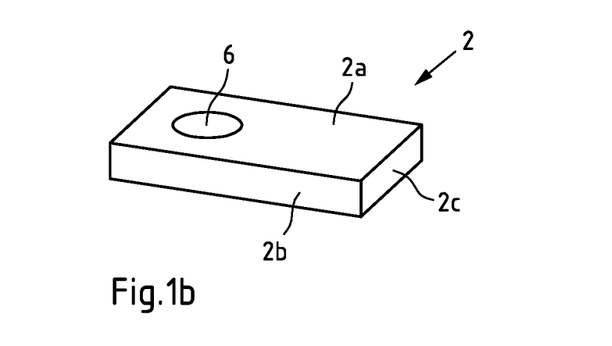

FIG. 1b shows a further flat part 2, which is formed, for example, as a connecting lug with a hole 6.

Figure 1C:
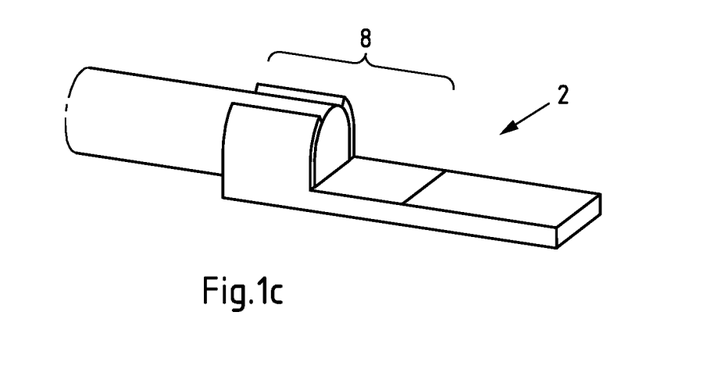

FIG. 1c shows another flat part 2, which transitions into a crimp connection in a crimping area 8.

The embodiments for the flat part 2 apply equally to a connecting part 10, so that the flat parts 2 shown in FIGS. 1a-c can also be connecting parts 10. A connecting part 10 can also be a stranded conductor.

Flat part 2 and/or connecting part 10 can be made of copper material or aluminium material. In particular, a connection between a copper material on the one hand and an aluminium material on the other hand is preferred.

To connect the flat part with the connecting part, the flat part 2 is first structured in relief in the area of a contact surface 10.

Figure 2A:
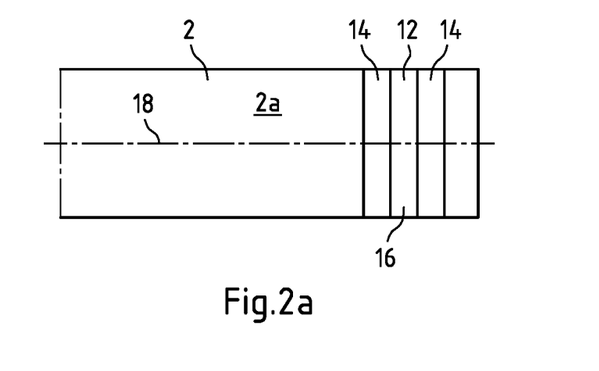
FIG. 2a,b a flat part with a structured, relief-like surface according to an embodiment.

FIG. 2a shows a top view of a flat part 2 with a contact surface 12. The contact surface 12 is formed by grooves 14 and intermediate groove webs 16. The grooves 14 can be understood as recesses and the groove webs 16 as protrusions.

Figure 2B:
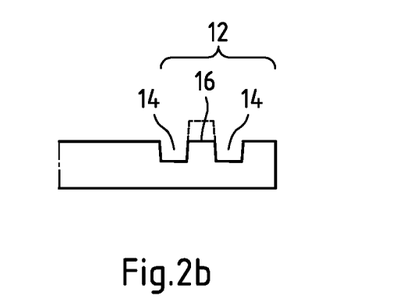

FIG. 2b shows that the webs 16 do not protrude from the plane of the wide surface 2a, but lie plane-parallel to it. However, it is also possible and indicated by the dashed lines in FIG. 2b that the webs 16 are raised and can, for example, protrude from the plane of the wide surface 2a. FIG. 2b shows the section through the flat part 2 along its longitudinal axis 18. A transverse axis 20 runs perpendicular to the longitudinal axis 18 into the drawing plane. The grooves 14 and groove ridges 16 run in parallel to the transverse axis 20.

Figure 3:
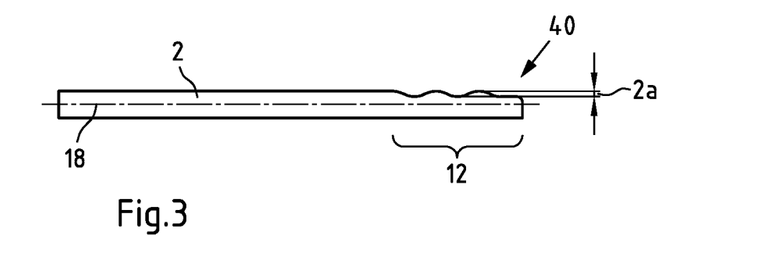
FIG. 3 a longitudinal section through a flat part.

FIG. 3 shows a longitudinal section through a flat part 2 along the longitudinal axis 18. It can be seen that the flat part 2 has a periodic, regular relief structure in the area of a contact surface 12, i.e. at a frontal end area. The amplitude of the relief structure is the value 2a and the relief structure follows the function a*sin 2πx, where x runs in the direction of the longitudinal axis 18. In the argument of the sin-function a factor can be specified, which determines the period. The factor a, as well as the factor in the argument of the sin-function can be dependent on the density of the material of the flat part 2.

Furthermore you can see, that in a frontal end area 40, the structure is no longer relief-like, but the surface of the flat part 2 is parallel to the surface in the area in front of the contact surface 12.

Figure 4:
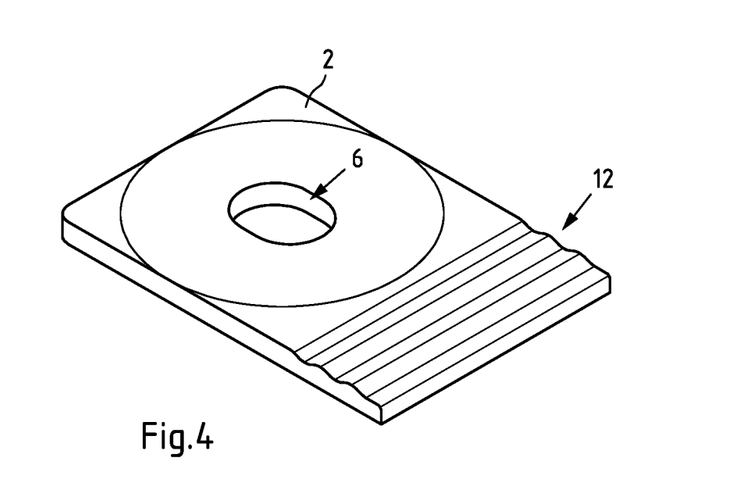
FIG. 4 a view of a flat part.

FIG. 4 shows a view of a flat part 2 with a contact surface 12 with a hole 6. In the area around the hole 6, a coating is applied to the flat part 2, e.g. roll cladded. The coating can be metallic.

Figure 5:
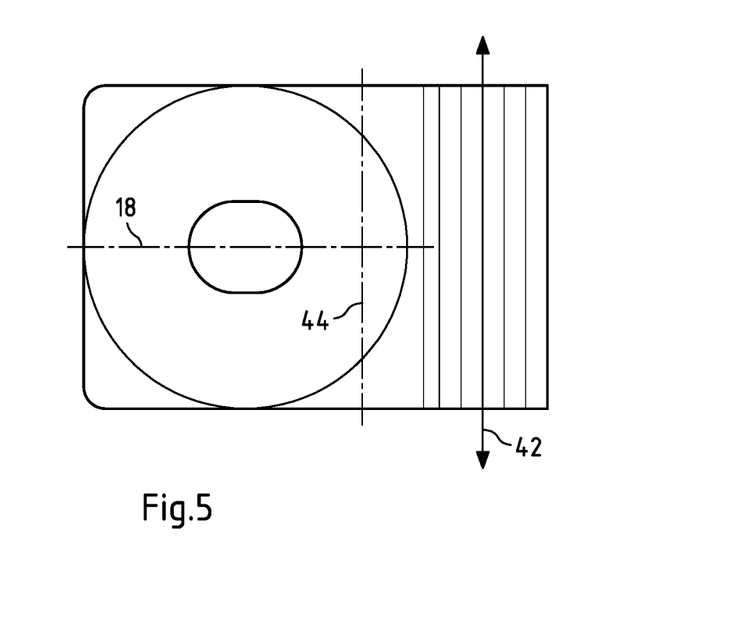
FIG. 5 a direction of oscillation of a sonotrode.

FIG. 5 shows the oscillation direction 42. The oscillation direction 42 is perpendicular to the longitudinal axis 18, i.e. parallel to a transverse axis 44. The grooves 14 as well as the groove webs 16 run parallel to the transverse axis 44.

Figure 6A:
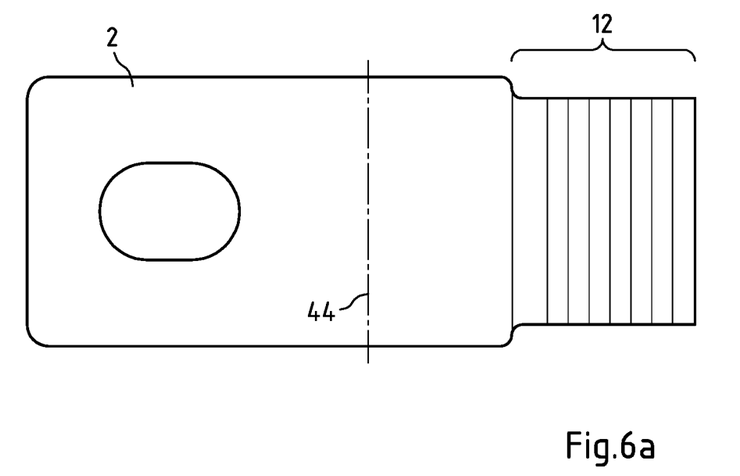
FIG. 6a-c different flat parts.

The transverse extent to the transverse axis 44 may be less in the area of the contact surface 12 than in front of the area of the contact surface 12, as shown in FIG. 6a. It can be seen that the transverse extent is reduced abruptly from an area in front of the contact surface 12 to an area of the contact surface 12.

Figure 6B:
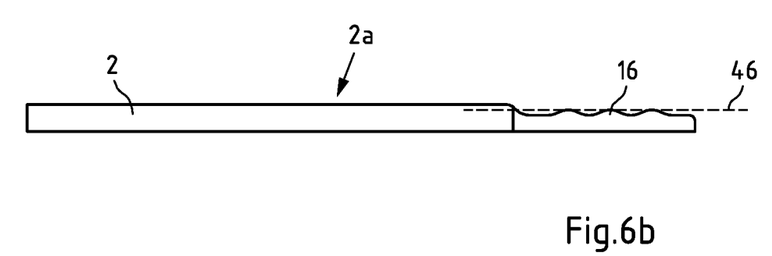

As shown in FIG. 6b, the groove webs 16 of the contact surface 12 can be located in a plane 46 which is below the plane of the wide surface 2a. This reduces the structural height of a connection between flat part 2 and connection part 10.

Figure 6C:
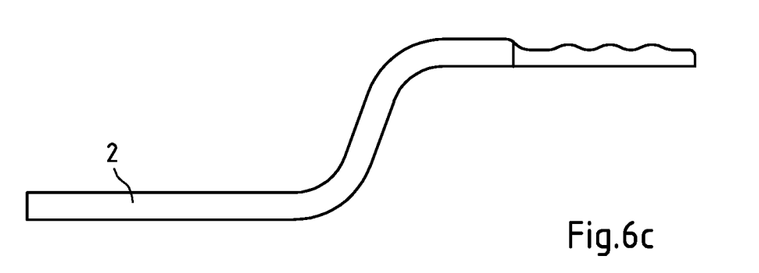

FIG. 6c shows that the longitudinal profile of flat part 2 can be S-shaped. This makes it possible to absorb compressing forces parallel to longitudinal axis 18.

Figure 7A:
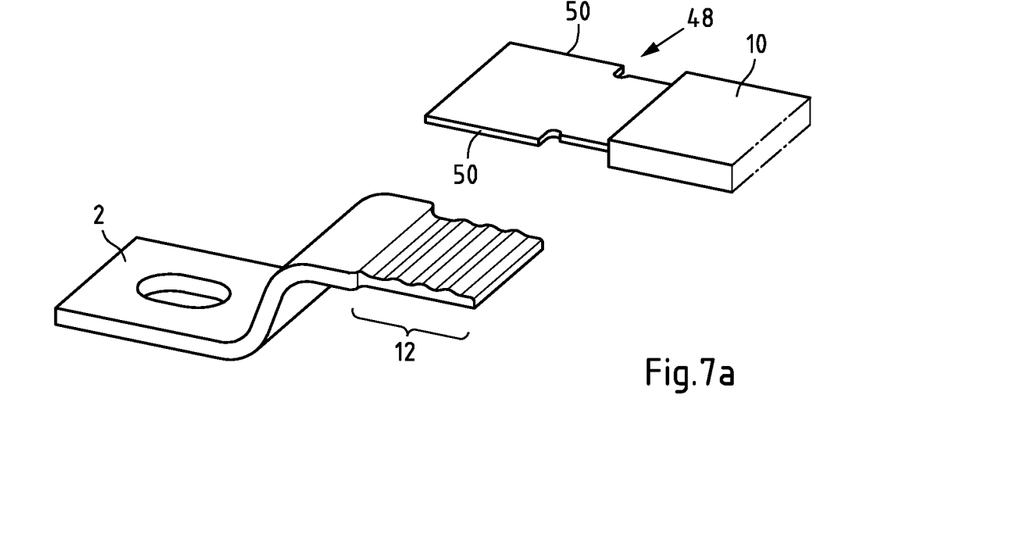
FIG. 7a-c an enclosure of a contact area.

FIG. 7a shows a view in which a connector 10 is moved towards a flat part 2. The front end of connector 10 is placed on the contact surface 12. A joining area is provided at the front end of the connector 10, which is optionally delimited from the rest of the connector 10 by notches 48. The optional notches 48 are provided on the longitudinal side edges of the connecting part 10.

The connecting part 10 is placed on the flat part 2 in the area of the contact surface 12. A welding tool is then placed onto the connecting piece 10 in the overlap zone. In particular, a sonotrode is placed onto it, which is countered by an anvil resting against the flat part. The sonotrode is set into oscillation and oscillates in oscillation direction 42 parallel to the direction of the grooves 14 and groove webs 16. The oscillation causes the side edges 50 of the connecting part 10 to be formed around the flat part 2, as can be seen in FIG. 7c, especially for aluminium. The connecting part 10 thus encloses the contact surface 12 in a U-shape. This forming is achieved during the welding process and does not require an additional process step. A material bond between the connecting part and the narrow surfaces of the flat part can also be achieved by the welding energy applied.

Figure 7B:
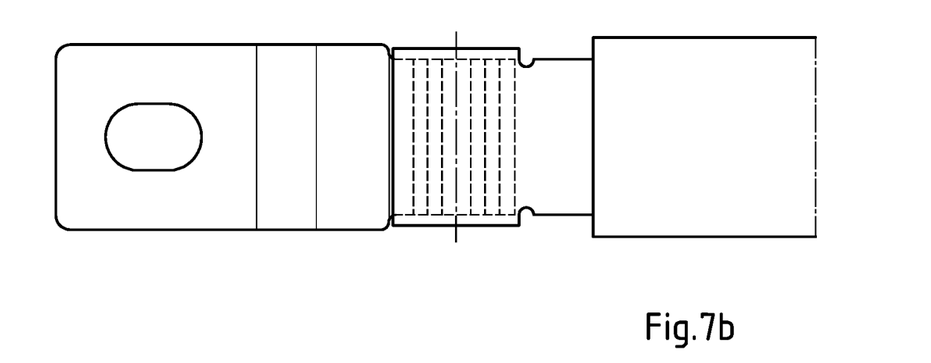
Figure 7C:
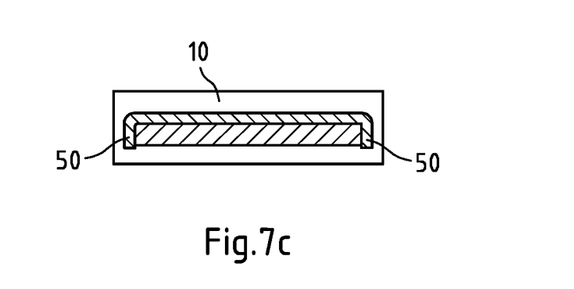

The connection between the connecting part 10 and the flat part 2 is shown in FIG. 7 b.

Figure 8A:
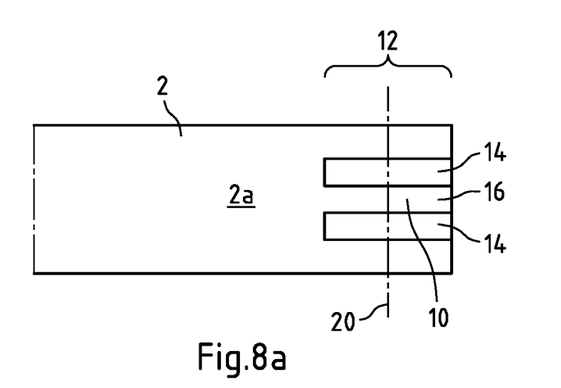
FIG. 8a,b a flat part with a structured, relief-like surface according to an embodiment.
Figure 8B:
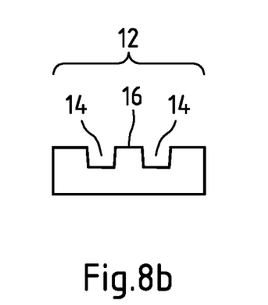

FIG. 8a shows another embodiment in which the grooves 14 and webs 16 run parallel to the longitudinal axis 18. FIG. 8b shows a cross-section along axis 20, which is perpendicular to the longitudinal axis 18. Here, too, grooves 14 and webs 16 can be seen.

In FIG. 2, grooves 14 and webs 16 are stepped along the longitudinal axis 18. In the flat part according to FIG. 8a, grooves 14 and webs 16 are stepped along the transverse axis 20.

Figure 9A:
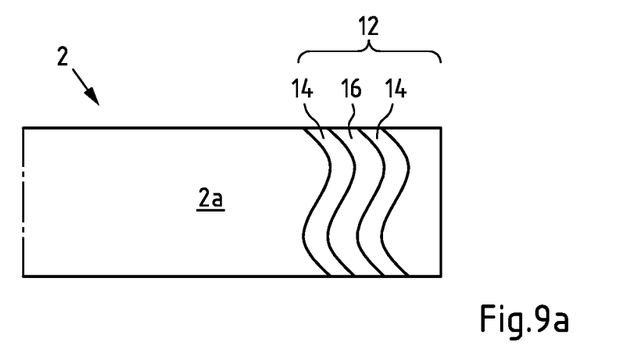
FIG. 9a-d flat parts with a structured, relief-like surface according to further design examples.
Figure 9B:
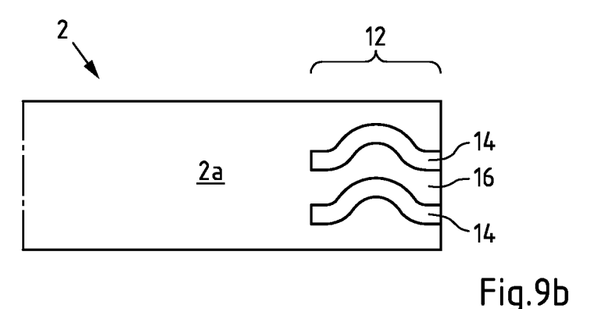
Figure 9C:
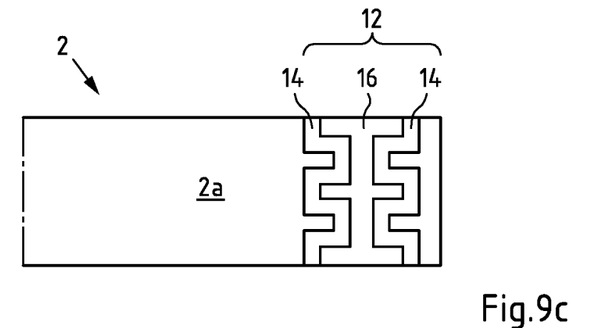
Figure 9D:
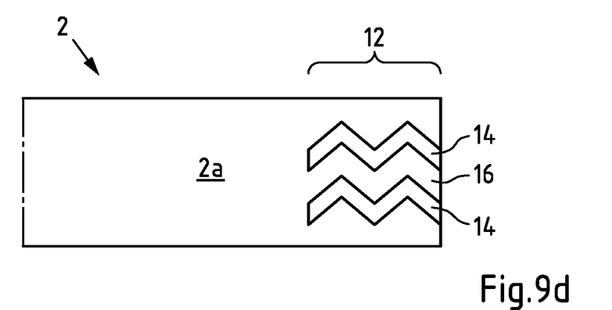

A wave shape along the longitudinal axis of the grooves 14 and/or webs 16 is shown in FIGS. 9a-d. FIG. 9a shows that on the wide surface 2a of the flat part 2 along the transverse axis 20, the grooves 14 and the webs 16 are undulated in their longitudinal extent. In FIG. 9b, on the other hand, the grooves 14 and webs 16 are stepped in their longitudinal extent. According to FIG. 9c, in contrast to FIG. 9a, grooves 14 and webs 16 extend parallel to the longitudinal axis 18 and are also undulated. According to FIG. 9d, in contrast to FIG. 2b, grooves 14 and webs 16 extend along the longitudinal axis 18 and are tooth-shaped.

All the shapes shown of protrusions and recesses in the area of a contact surface 12 can be understood as structured relief-like.

Figure 10:
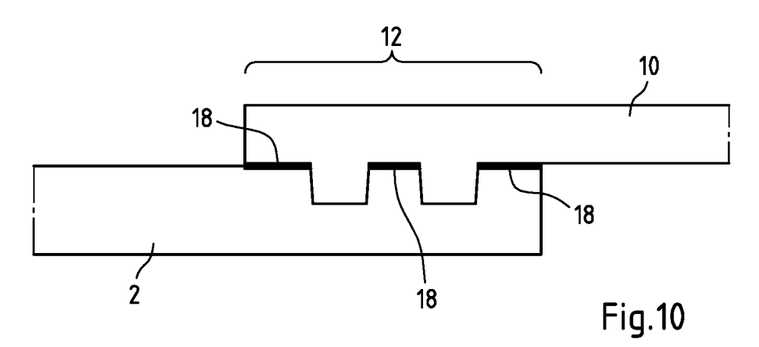
FIG. 10 flat parts lying against each other and connecting parts according to an embodiment.

FIG. 10 shows the beginning of a welding process. A terminal part 10 is placed on a flat part 12 in the area of the contact surface 12. It can be seen that the touching surfaces 17 are smaller than the contact surface 12, which means that at the beginning of the welding process the contact pressure is distributed over a smaller area and thus an increased contact pressure leads to improved plasticizing.

In FIG. 10, flat part 2 and connection part 10 run uniformly with their longitudinal axes.

Figure 11:
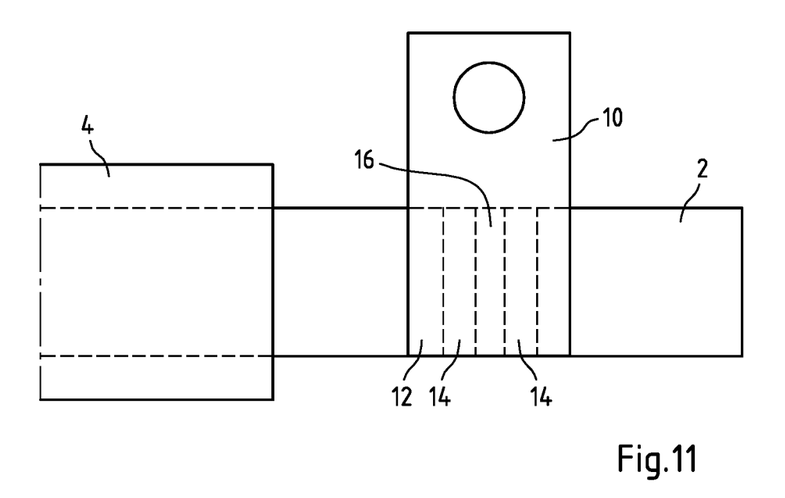
FIG. 11 an overlap area between connecting part and flat part according to an embodiment.

FIG. 11 shows that the connecting part 10 can also run transversely, especially perpendicular to the longitudinal axis of flat part 2, and that the contact surface 12 is located in an overlap area.

Due to the structure of the flat part in the contact surface, the joining partners are fixed relative to each other before the actual welding process. The connecting part 10 is pressed against the contact surface by a sonotrode. This already leads to a superficial interlocking between the surface of the connecting part 10 and the structure of the flat part 12.

If the sonotrode is then set into oscillation, the relative position of the joining partners is already fixed by this interlocking. Slipping does not occur. This is especially the case if the direction of oscillation is parallel to the course of the hills and valleys.

Figure 12:
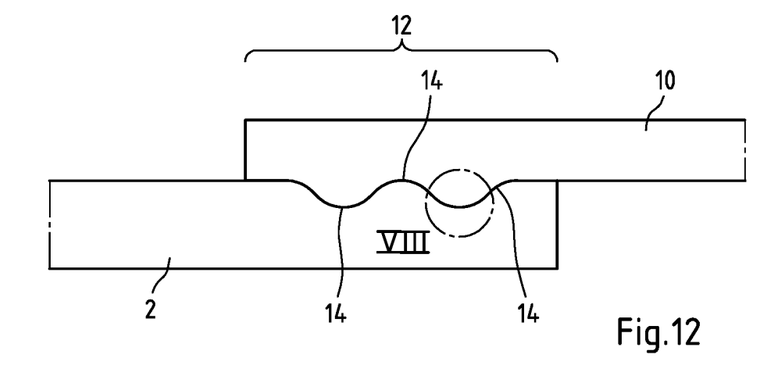
FIG. 12 a weld between connecting part and flat part according to an example of design.

FIG. 12 shows flat part 2 and connecting part 10 in the welded state. In the area of the contact surface 12, the connecting part 10 has penetrated completely into the grooves 14 and the elevation 16 has penetrated completely into the connecting part 10. This results in a welded surface that extends over the entire contact surface.

Figure 13:
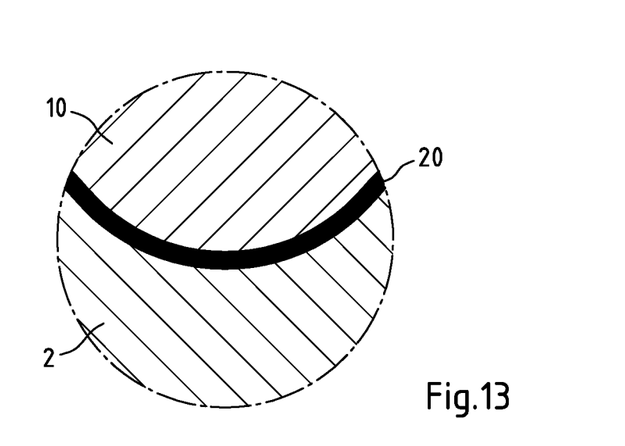
FIG. 13 a detailed representation of a joining zone.

As shown in FIG. 13, the intermetallic transition is formed by a joining zone 21, in which an intermetallic connection is formed between the material of the flat part 2 and the material of the connecting part 10. The depth of the joining zone 21 is, however, considerably less than the depth of a groove 14 or the distance between the upper edge of an protrusion 16 and the bottom of a recess 14, so that even after welding, the relief-like, structured surface is visible.

Figure 14:
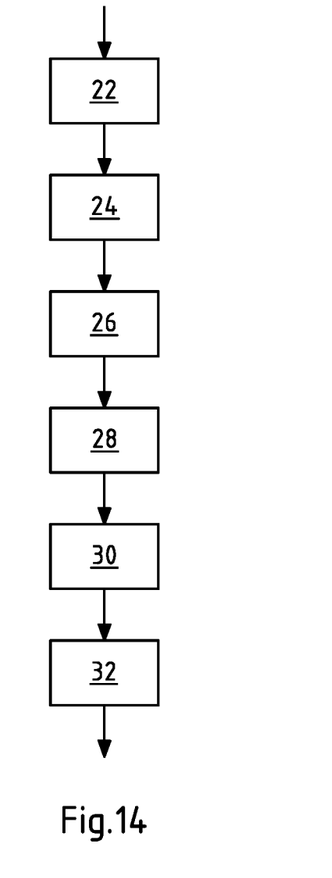
FIG. 14 the sequence of an actual process according to an example.

FIG. 14 shows the procedure of a method according to the subject-matter. First a flat part is provided (22).

Then the relief-shaped, structured surface is inserted into the flat part, for example as shown in FIGS. 2-4, by means of punching or milling (24). A connecting part is then provided (26).

The connecting part is placed on the flat part (28).

Then the connecting part is pressed against the flat part by means of a welding tool and set into oscillation (30). The oscillation is especially an ultrasonic oscillation. During welding, the surface of the flat part and the connecting part melts in the area of the touching surface and the connecting part gradually penetrates into the structured, relief-like surface of the flat part. At the end of the welding process (32), the connecting part is fully welded to the flat part in the area of the contact surface. The oscillation runs parallel to the relief-like structure. The structure is periodic in the direction of the longitudinal axis of the flat part. The structure has hills and valleys which extend perpendicular to the longitudinal axis of the flat part. The oscillation is also perpendicular to the longitudinal axis of the flat part.

What is claimed is:

1. Electrical connection between a flat part and a connecting part wherein
   the flat part and the connecting part are arranged one above the other in an overlap area,
   a contact surface of the flat part facing the connecting part in the overlap area has a relief-like structure and
   the flat part is friction-welded, in particular ultrasonically welded, to the connecting part via the structured contact surface,
   wherein
   the connecting part has completely penetrated into the relief-like surface of the flat part and a full-surface connection between the connecting part and the contact surface is formed, wherein the contact surface is structured in a longitudinal section of the flat part before and after welding, and wherein the connecting part wraps around the flat part in a U-shape in the overlap area.

2. Electrical connection according to claim 1, wherein the structure is regularly periodic.

3. Electrical connection according to claim 1, wherein the contact surface is free of the structure in one end face area.

4. Electrical connection according to claim 1, wherein in a front end area the contact surface is parallel to a wide surface of the flat part in front of the contact surface.

5. Electrical connection according to claim 1, wherein the flat part has a lower height extent in the area of the contact surface than in an area in front of the contact surface.

6. Electrical connection according to claim 1, wherein the flat part has a smaller width extent in the area of the contact surface than in an area in front of the contact surface.

7. Electrical connection according to claim 1, wherein the connecting part is a flat conductor, the connecting part protrudes beyond the flat part in the width extent in the overlap area and the connecting part is bent around at least one longitudinal edge of the flat part in the overlap area.

8. Electrical connection according to claim 1, wherein the flat part is metallically coated in the area of the contact surface.

9. Electrical connection according to claim 1, wherein the flat part has a terminal console on its side opposite the contact surface in the longitudinal direction.

10. Electrical connection according to claim 9, wherein the terminal console is formed as a connection opening.

11. Electrical connection according to claim 10, wherein the terminal console is metallically coated, in particular the flat part is metallically coated around the connection opening.

12. Electrical connection according to claim 1, wherein the flat part has an S-shaped longitudinal profile.

13. Electrical connection according to claim 1, wherein the flat part is formed from aluminium material and the connecting part is formed from copper material or the connecting part is formed from aluminium material and the flat part is formed from copper material.

14. Electrical connection according to claim 1, wherein the relief-like contact surface is undulated or stepped in a longitudinal section or a cross-section through the flat part.

15. Electrical connection according to claim 14, wherein the structured surface is undulated or stepped in a top view.

16. Electrical connection according to claim 1, wherein the structured surface is formed by recesses in the surface of the flat part.

17. Electrical connection according to claim 16, wherein the recesses are formed by grooves in the contact surface.

18. Electrical connection between a flat part and a connecting part, wherein
the flat part and the connecting part are arranged one above the other in an overlap area,
a contact surface of the flat part facing the connecting part in the overlap area has a relief-like structure and
the flat part is friction-welded, in particular ultrasonically welded, to the connecting part via the structured contact surface,
wherein
the connecting part has completely penetrated into the relief-like surface of the flat part and a full-surface connection between the connecting part and the contact surface is formed, wherein the contact surface is structured in a longitudinal section of the flat part before and after welding, and
wherein the structure in the direction of a longitudinal axis x of the contact surface is formed according to a function $$h(x)=h_0 f(x)$$

where h is the amplitude and f(x) is a trigonometric function, especially $\sin(2\pi x)$ or $\cos(2\pi x)$.

19. Electrical connection according to claim 18, wherein the connecting part wraps around the flat part in a U-shape in the overlap area.

20. Method of establishing an electrical connection between a flat part and a connecting part comprising:
providing a flat part,
forming a structured, relief-like structure into the flat part in a contact surface of the flat part,
providing a connection part,
placing the connecting part on the flat part in the area of the relief-like structure,
pressing the connecting part onto the flat part with a welding tool and friction welding, in particular ultrasonic welding between connecting part and flat part,
wherein the welding tool oscillates parallel to the relief-like structure, so that the connecting part has completely penetrated into the relief-like surface of the flat part and a full-surface connection between the connecting part and the contact surface is formed,
wherein the structure is formed by hills and valleys extending in the transverse direction of the flat part and the welding tool oscillates parallel to the hills and valleys.

21. Method according to claim 20, wherein the connecting part and/or the flat part during welding initially plasticize in the region of a protrusion of the relief-like surface as a result of the oscillation introduced and, as the welding duration increases, plasticize the connecting part and/or the flat part down to a bottom of a recess in the relief-like surface.

22. Method according to claim 20, wherein before welding, the connecting part is pressed onto the relief-like structure, this fixes a relative position of the longitudinal axes of the connecting part and flat part with respect to one another, and the flat part and connecting part are then welded together.

23. Electrical connection between a flat part and a connecting part wherein
the flat part and the connecting part are arranged one above the other in an overlap area,
a contact surface of the flat part facing the connecting part in the overlap area has a relief-like structure and
the flat part is friction-welded, in particular ultrasonically welded, to the connecting part via the structured contact surface,
wherein
the connecting part has completely penetrated into the relief-like surface of the flat part and a full-surface connection between the connecting part and the contact surface is formed, wherein the contact surface is structured in a longitudinal section of the flat part before and after welding, and
wherein the connecting part is a flat conductor, the connecting part protrudes beyond the flat part in the width extent in the overlap area and the connecting part is bent around at least one longitudinal edge of the flat part in the overlap area.

24. Electrical connection according to claim 23,
wherein the flat part has a terminal console on its side opposite the contact surface in the longitudinal direction.

25. Electrical connection according to claim 23,
wherein the structured surface is formed by recesses in the surface of the flat part.

26. Electrical connection between a flat part and a connecting part wherein
the flat part and the connecting part are arranged one above the other in an overlap area,
a contact surface of the flat part facing the connecting part in the overlap area has a relief-like structure and
the flat part is friction-welded, in particular ultrasonically welded, to the connecting part via the structured contact surface,
wherein
the connecting part has completely penetrated into the relief-like surface of the flat part and a full-surface connection between the connecting part and the contact surface is formed, wherein the contact surface is structured in a longitudinal section of the flat part before and after welding,
wherein the relief-like contact surface is undulated or stepped in a longitudinal section or a cross-section through the flat part and wherein the structured surface is undulated or stepped in a top view.

27. Method of establishing an electrical connection between a flat part and a connecting part comprising:
providing a flat part,
forming a structured, relief-like structure into the flat part in a contact surface of the flat part,
providing a connection part,
placing the connecting part on the flat part in the area of the relief-like structure,
pressing the connecting part onto the flat part with a welding tool and friction welding, in particular ultrasonic welding between connecting part and flat part,
wherein the welding tool oscillates parallel to the relief-like structure, so that the connecting part has completely penetrated into the relief-like surface of the flat part and a full-surface connection between the connecting part and the contact surface is formed,
wherein the connecting part and/or the flat part during welding initially plasticize in the region of a protrusion of the relief-like surface as a result of the oscillation introduced
and, as the welding duration increases, plasticize the connecting part and/or the flat part down to a bottom of a recess in the relief-like surface.

28. Method according to claim 27,
wherein before welding, the connecting part is pressed onto the relief-like structure, this fixes a relative position of the longitudinal axes of the connecting part and flat part with respect to one another, and the flat part and connecting part are then welded together.

* * * * *